United States Patent [19]

Yoshida

[11] Patent Number: 4,910,618
[45] Date of Patent: Mar. 20, 1990

[54] GUIDE STRUCTURE FOR GUIDING ENDLESS MAGNETIC TAPE IN A ROTARY HEAD TRANSPORT

[75] Inventor: Kobun Yoshida, Sayama, Japan

[73] Assignee: TEAC Corporation, Tokyo, Japan

[21] Appl. No.: 224,582

[22] Filed: Jul. 26, 1988

[30] Foreign Application Priority Data

Jul. 27, 1987 [JP] Japan .................................. 62-187253
Jul. 27, 1987 [JP] Japan .................................. 62-187254
Jul. 27, 1987 [JP] Japan .................................. 62-187255

[51] Int. Cl.⁴ ............................................. G11B 5/027
[52] U.S. Cl. ................................ 360/85; 242/55.19 A
[58] Field of Search ..................... 360/84, 85, 90, 93, 360/96.5; 242/55.19 A

[56] References Cited

U.S. PATENT DOCUMENTS 4,378,575   3/1983   Komatsu ........................... 360/93

FOREIGN PATENT DOCUMENTS 54-95205    4/1979   Japan .
54-95204    7/1979   Japan .
56-145556   3/1981   Japan .

*Primary Examiner*—A. J. Heinz
*Attorney, Agent, or Firm*—Michael N. Meller

[57] ABSTRACT

A guide structure for an endless magnetic tape has a stationary reel on which the tape is wound in a form of a tape roll. The tape is drawn out from an innermost turn of the tape roll and is taken up on an outermost turn of the tape roll. The guide structure has guides for guiding the tape between the innermost turn and the outermost turn of the tape roll so as to avoid the tape from being twisted.

20 Claims, 12 Drawing Sheets

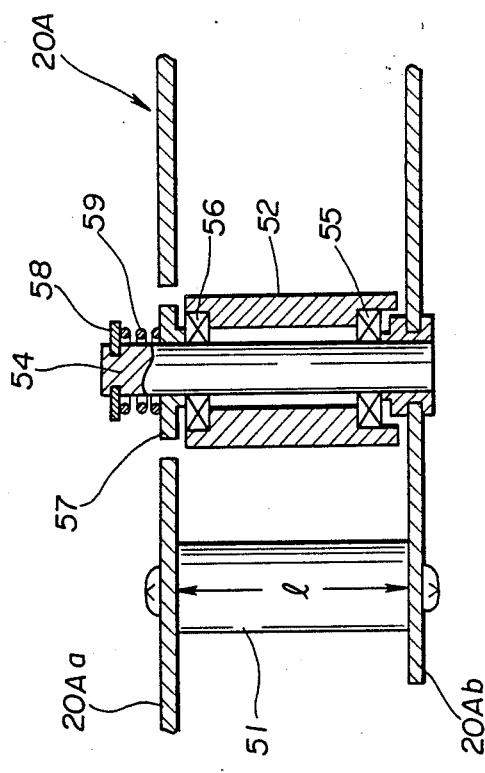

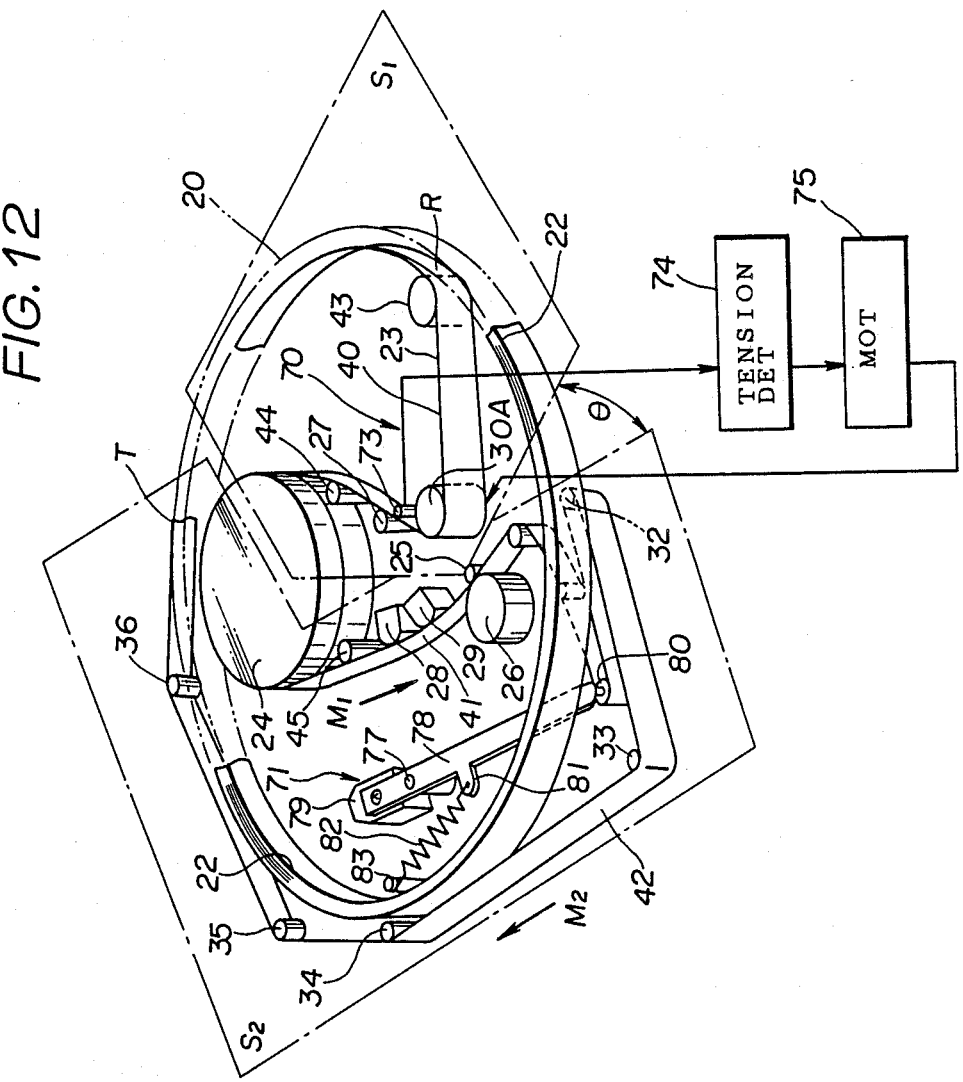

GUIDE STRUCTURE FOR GUIDING ENDLESS MAGNETIC TAPE IN A ROTARY HEAD TRANSPORT

BACKGROUND OF THE INVENTION

The present invention generally relates to guide structures for guiding endless magnetic tapes, and more particularly to a guide structure for guiding an endless magnetic tape in an endless video tape recorder which plays the endless magnetic tape.

In audio tape recorders, there is an audio tape recorder which uses a tape cartridge which accommodates an endless magnetic tape having the shape of an endless loop. By using this tape cartridge in place of the existing video tape cassette having two reels, it is in principle possible to realize an endless video tape recorder which can record and/or reproduce information in an endless manner.

However, there are strict requirements on video tape recorders, and it is required that a load acting on the tape transport is small and the tape transport is stable. Especially in a video tape recorder which plays an endless magnetic tape which is wound on a stationary reel in the form of a tape roll and the tape is drawn out to the inside of the stationary reel from an innermost turn of the tape roll, the load acting on the tape transport is large due to friction between the tape and the stationary reel. Hence, measures must be taken to reduce the load acting on the tape transport.

In the video tape recorder which uses the stationary reel, the tape which is drawn out to the inside of the stationary reel from the innermost turn of the tape roll must pass over or under the stationary reel in order to reach an outermost turn of the tape roll to be taken up on the tape roll. It is unavoidable that the height of the tape path greatly changes. When the height of the tape path changes, the tape transport easily becomes unstable and the tape is easily damaged. For this reason, the tape path must be selected so as to minimize the instability of the tape transport and minimize the damage to the tape. In addition, the tape is inevitably twisted when the tape is drawn to from the innermost turn of the tape roll and then returned to the outermost turn of the tape roll. Therefore, this kind of endless video tape recorder is impractical in that the tape transport is unstable at a part where the information recording and/or reproduction is carried out and the tape is easily damaged because the tape is drawn out from the innermost turn of the tape roll while being twisted.

FIG. 1 shows an essential part of an example of the conventional endless video tape recorder. In FIG. 1, the essential part of the endless video tape recorder has a stationary reel 1 which cannot rotate, a stationary head 2, a capstan 3, a pinch roller 4, an overturn guide 5, a head moving mechanism 6, an endless magnetic tape 7 which has the shape of an endless loop, and a tape roll 8 made up of the tape 7 which is woun on the stationary reel 1.

When the capstan 3 is rotated in a direction A and the tape 7 is driven in a state pinched between the capstan 3 and the pinch roller 4, the tape 7 at an innermost turn of the tape roll 8 is drawn out to the inside of the stationary reel 1. The drawn out tape 7 makes sliding contact with the stationary head 2 and is then guided by the overturn guide 5. The transport direction of the tape 7 is changed by the overturn guide 5 and the tape 7 reaches an outermost turn of the tape roll 8 to be taken up on the stationary reel 1. The tape 7 is thus transported in a forward direction $A_1$ when the capstan 3 rotates in the direction A.

The stationary head 2 is shifted in the width direction of the tape 7 by the head moving mechanism 6 every time the tape 7 makes one round. Hence, a video track 9 shown in FIG. 2 is formed on the tape 7. When the stationary head 2 is shifted to a final position, the head moving mechanism 6 then shifts the stationary head 2 back to the original position. In FIG. 2, a start position 10 of the track 9 corresponds to the original position of the stationary head 2 and an end position 11 of the track 9 corresponds to the final position of the stationary head 2.

In the tape path from a position after the tape 7 passes the stationary head 2 to the outermost turn of the tape roll 8, the tape 7 is transported while being twisted. Therefore, there are problems in that the tape transport becomes unstable and the tape 7 is easily damaged due to the twist.

Furthermore, since the stationary head 2 is used for the information recording and/or reproduction, the tape 7 is transported at a high speed $v_1$ of 5.5 m/sec. Because of the high tape transport speed $v_1$, there are problems in that the tape 7 is easily damaged, the load acting on the tape transport is large, the tape 7 is heated, the tape transport is unstable, the reliability of the endless video tape recorder becomes poor and the like On the other hand, the start position 10 and the end position 11 of the video track 9 are discontinuous. From this point of view, the recording and/or reproduction cannot be carried out continuously even though the tape 7 has the shape of an endless loop.

SUMMARY OF THE INVENTION

Accordingly, it is a general object of the present invention to provide a novel and useful guide structure for endless magnetic tape in which the problems described heretofore are eliminated.

Another and more specific object of the present invention is to provide a guide structure for an endless magnetic tape, which guides the endless magnetic tape without twisiing the endless magnetic tape at an entrance side and an exit side of a guide drum which has rotary magnetic heads along a transport direction of the endless magnetic tape. According to the guide structure of the present invention, the tape ransport is stable at a peripheral surface of the guide drum and it is possible to obtain satisfactory recording and reproducing characteristics. In addition, the transport speed of the tape can be made slow and the damage to the tape can be reduced, thereby improving the reliability of the endless video tape recorder. Furthermore, because the recording and reproduction are carried out based on the so-called helical scan system, it is possible to realize a perfectly continuous recording and reproduction having no discontinuity between the start and end of the recording and reproduction.

Still another object of he present invention is to provide a guide structure for an endless magnetic tape provided with a stationary reel having a plurality of rollers and the endless magnetic tape is wound around the rollers. According to the guide structure of the present invention, an innermost turn of a tape roll of the endless magnetic tape is transported while rotating each of the rollers, and a load acting on the tape transport is extremely small. As a result, it is possible to maintain the tape transport very stable.

A further object of the present invention is to provide a guide structure for an endless magnetic tape provided with a tape tension control part for controlling a tape tension in a tape path located on an exit side of a guide drum along a transport direction of the endless magnetic tape. According to the guide structure of the present invention, it is possible to further stabilize the tape transport.

Another object of the present invention is to provide a guide structure for an endless magnetic tape provided with a tape tension control part for controlling a tape tension in a tape path located on an entrance side of a guide drum along a transport direction of the endless magnetic tape. According to the guide structure of the present invention, it is possible to further stabilize the tape transport and control a contact pressure of the rotary magnetic heads with respect to the endless magnetic tape.

Still another object of the present invention is to provide a guide structure for an endless magnetic tape, a part of which is made in a form of a tap cartridge. According to the guide structure of the present invention, it is possible to load and unload the endless magnetic tape to and from the endless video tape recorder with ease.

Other objects and further features of the present invention will be apparent from the following detailed description when read in conjunction with the accompanying drawings.

BRIEF DESCRIPTION OF THE DRAWINGS

FIG. 11 is a cross sectional view of the guide structure along a line XI—XI in FIG. 10 showing the structure of a roller on an enlarged scale;

FIG. 12 is a perspective view showing a fourth embodiment of the guide structure for endless magnetic tape according to the present invention together with a part of the endless video tape recorder;

DETAILED DESCRIPTION

Figure 1:
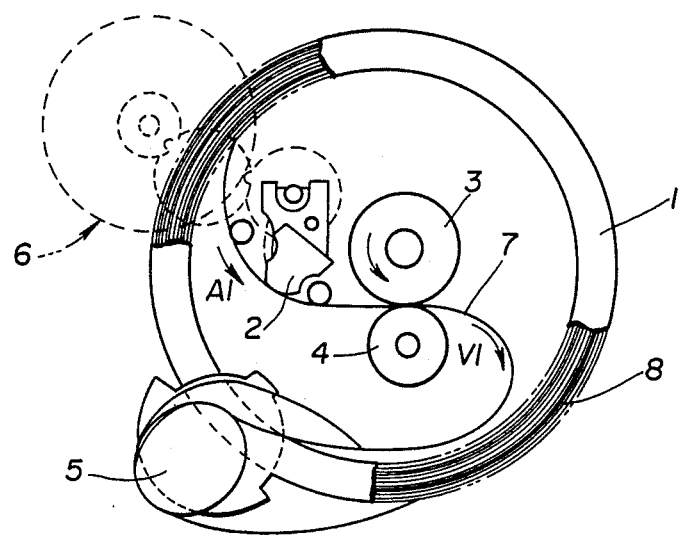
FIG. 1 is a plan view showing a guide structure for guiding an endless magnetic tape in an example of the conventional endless video tape recorder.
Figure 2:
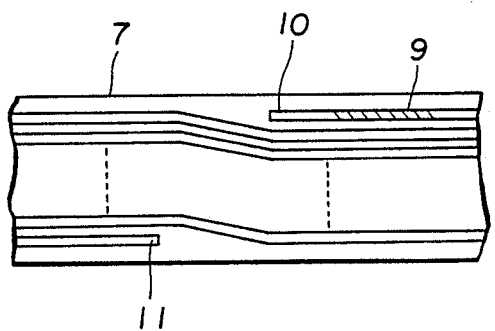
FIG. 2 shows a portion of a track pattern formed on the endless magnetic tape by the conventional endless video tape recorder.
Figure 3:
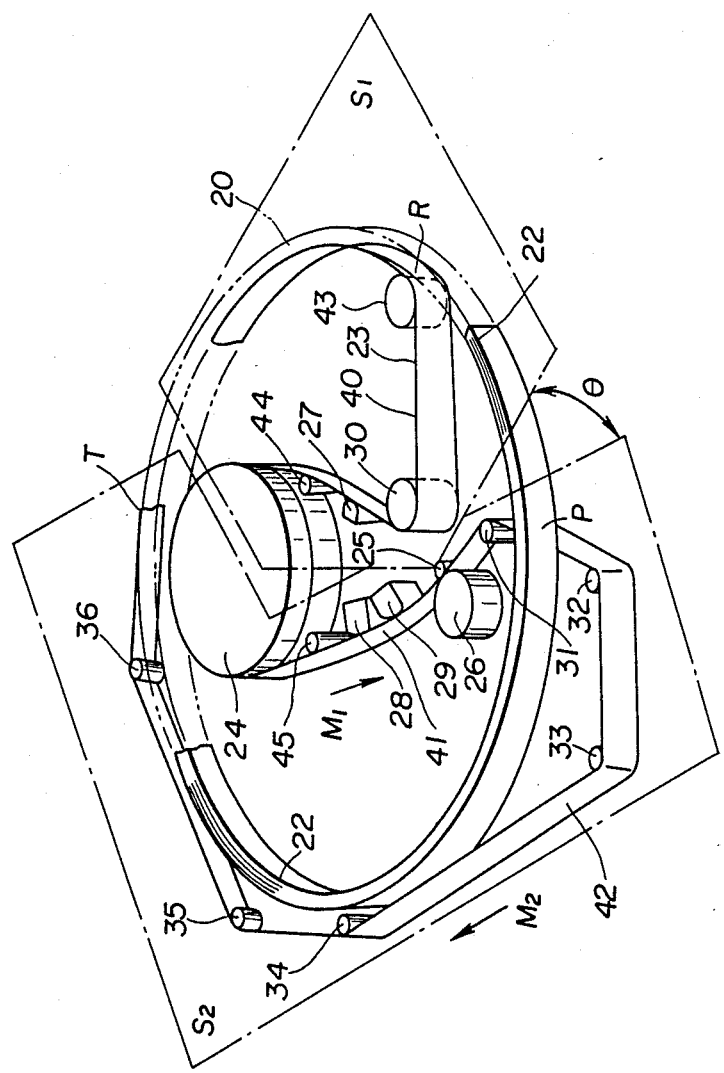
FIG. 3 is a perspective view showing a first embodiment of the guide structure for endless magnetic tape according to the present invention together with a part of the endless video tape recorder.
Figure 4:
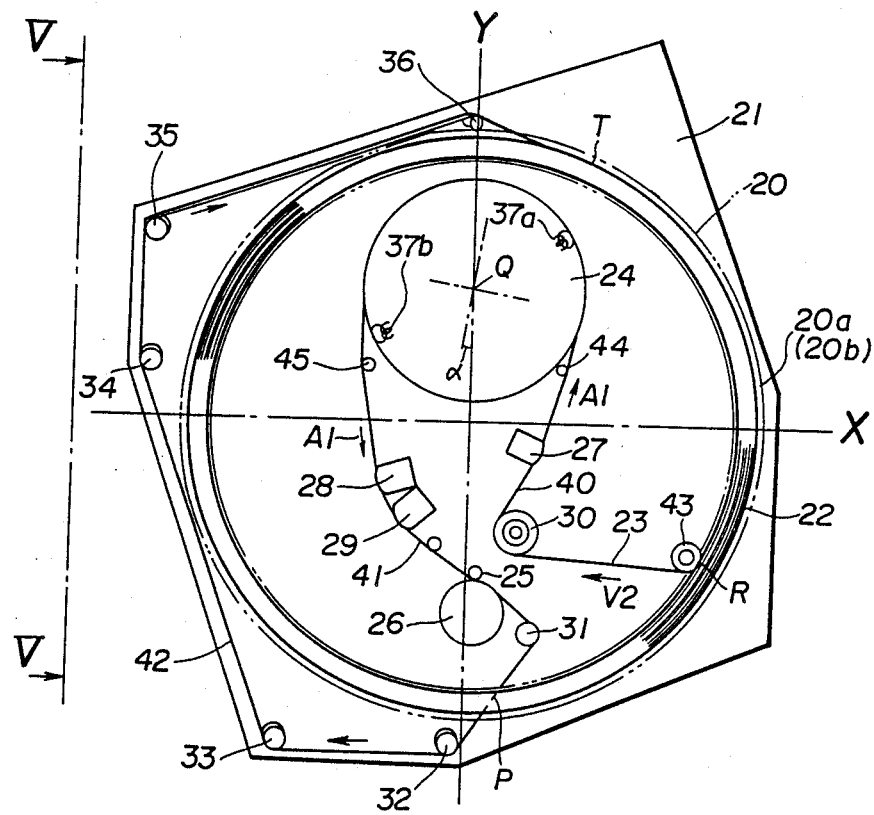
FIG. 4 is a plan view of the guide structure shown in FIG. 3.
Figure 5:
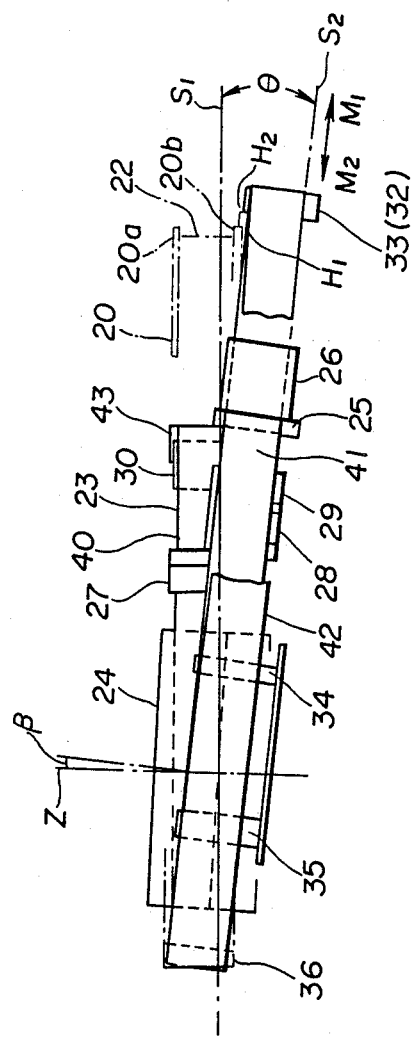
FIG. 5 is a side view showing the guide structure shown in FIG. 4 viewed from a direction V.

FIG. 3 is a perspective view showing a first embodiment o the guide structure for endless magnetic tape according to the present invention together with a part of the endless video tape recorder. FIG. 4 is a plan view of the first embodiment, and FIG. 5 is a side view of the first embodiment viewed from a direction V in FIG. 4. In FIG. 4, X and Y denote reference axes of the guide structure.

In FIGS. 3 through 5, a stationary reel 20 having a ring shape of a large diameter is fixedly provided on a chassis 21. The stationary reel 20 is horizontally arranged and a center thereof coincides with an intersection of the reference axes X and Y. $S_1$ denotes a horizontal plane on which the stationary reel 20 is arranged. An endless magnetic tape 23 is wound on the stationary reel 20 in the form of a tape roll 22, and the height of the tape roll 22 is accurately maintained by upper and lower flanges 20a and 20b of the stationary reel 20 which restrict the movement of the tape 23 in a width direction of the tape 23.

A guide drum 24 constituting a recording and/or reproducing part and a capstan 25 and a pinch roller 25 which constitute a tape transport part are provided on the inside of the stationary reel 20 in the plan view.

A full width erase head 27, an audio head 28, a control head 29 and an impedance roller 30 are also provided on the inside of the stationary reel 20 in the plan view.

Tape guide poles 31 through 36 constitute a tape guide part. The guide pole 31 is located on the inside of the stationary reel 20 in the plan view, while the guide poles 32 through 36 are arranged on the outside of the stationary reel 20 in the plan view.

The guide drum 24 has a pair of rotary magnetic heads 37a and 37b. The guide drum 24 is provided at a position Q which is located on the inside of the stationary reel 20 and confronts a position P where the tape 23 passes under the stationary reel 20. The guide drum 24 is inclined by an angle $\alpha$ with respect to the axis Y and is inclined by an angle $\beta$ with respect to an axis Z. The angles $\alpha$ and $\beta$ are set so that the tape 23 drawn out from the stationary reel 20 is wrapped around the outer peripheral surface of the guide drum 24 without being twisted and the tape 23 separating from the peripheral surface of the guide drum 24 extends obliquely downwardly without being twisted.

Next, a description will be given of the tape path. The tape path is made up o tape path portions 40, 41 and 42. The entrance side tape path portion 40 begins from a position where the tape 23 is drawn out from an innermost turn of the tape roll 22 and ends at a position where the tape 23 reaches the guide drum 24. The exit side tape path portion 41 begins from a position where the tape 23 separates from the peripheral surface of the guide drum 24 and ends at a position under the stationary reel 20. The return tape path portion 42 begins at the position under the stationary reel 20 and ends at a position where the tape 23 is returned to an outermost turn of the tape roll 22 after being transported on the outside of the stationary reel 20 for approximately one-half the circumference thereof.

A description will now be given of the operation of the embodiment during the recording and/or reproduction and especially of the tape transport. The tape 23 is driven in a state pinched between the capstan 25 and the pinch roller 26 and is transported in a direction $A_1$ at a transport speed $v_2$ of approximately 30 mm/sec.

The entrance side tape path portion 40 greatly affects the stability of the tape transport at the peripheral surface of the guide drum 24. In the tape path portion 40, the tape 23 is guided by a guide roller 43 from a position R and is drawn out to the inside of the stationary reel 20. The tape 23 is then wrapped partially around the impedance roller 30, makes sliding contact with the full width erase head 27 and reaches the peripheral surface of the guide drum 24.

The guide roller 43, the impedance roller 30, the full width erase head 27 and a pole 44 are all located on the horizontal plane $S_1$ and are provided perpendicularly to the horizontal plane $S_1$. Accordingly, in the tape path portion 40, the tape 23 is drawn out of the tape roll 22 without being twisted and extend maintaining such a state that a surface of the tape 23 is perpendicular to the horizontal plane $S_1$.

The tape 23 is drawn out from the innermost turn of the tape roll 22 without being twisted and is transported parallel to the horizontal plane $S_1$ without being twisted. Thus, the tape 23 is transported in a state where the causes which disturb the tape transport are minimized. The provision of the impedance roller 30 even further stabilizes the tape transport.

Then, the tape 23 is wrapped around the peripheral surface of the guide drum 24 for an angular range of approximately 180 degrees defined by poles 44 and 45 and is transported while making sliding contact with the peripheral surface of the guide drum 24. The rotary magnetic heads 37a and 37b alternately scan the tape 23 in conformance with the helical scan system, and a video signal is recorded on tracks 46 during the recording and the video signal is reproduced from the tracks 46 during the reproduction. The traces 46 are formed obliquely to a longitudinal direction of the tape 23.

Because the tape transport in the tape path portion 40 is stable, the tape transport at the peripheral surface of the guide drum 24 is also stable. Therefore, the recording of the video signal can be carried out stably, and the video signal can be reproduced stably without a jitter.

The tape 23 which separates from the peripheral surface of the guide drum 24 is transported parallel to a plane $S_2$ which is inclined by a predetermined angle in a predetermined direction with respect to the horizontal plane $S_1$. The surface of the tape 23 is maintained perpendicular to the plane $S_2$ while being transported parallel to the lane $S_2$. The tape 23 makes sliding contact with the audio head 28 and the control head 29 and is pinched between the capstan 25 and the pinch roller 26. Thereafter, the tape 23 is guided by the guide pole 31 and is guided bliquely downwardly as indicated by an arrow $M_1$. At the position P where the tape 23 passes under the stationary reel 20, a height $H_1$ of the top edge of the tape 23 is lower than a height $H_2$ of a bottom surface of the stationary reel 20, that is, a lower surface of the lower flange 20b.

The tape 23 which is transported by the capstan 25 and the pinch roller 26 is guided by the guide pole 31 and passes under the stationary reel 20 at the position P to the outside of the stationary reel 20 in the plan view. The tape 23 is successively guided by the guide poles 32, 33, 34 and 35 and is transported generally along the outside of the stationary reel 20 in the plan view while being guided obliquely upwardly as indicated by an arrow $M_2$ from the plane $S_2$. Thus, the height of the tape 23 gradually returns to the original height, that is, to the height of the stationary reel 20, and the tape 23 is directed to a position T which is approximately diametrical to the position P. The tape 23 is lastly guided by the guide pole 36 before being taken up on the outermost turn of the tape roll 22, and the guide pole 36 returns the height of the tape 23 to the original height which coincides with that of the stationary reel 20. The tape 23 is taken up on the outermost turn of the tape roll 22 at the position T.

The tape 23 has the shape of an endless loop. Hence, when the tape 23 is transported, the tape 23 is drawn out from the innermost turn of the tape roll 22 while the tape 23 is taken up on the outermost turn of the tape roll 22. In other words, the tape 23 is transported continuously in an endless manner while the tape roll 22 rotates clockwise independently of the stationary reel 20.

Figure 6:
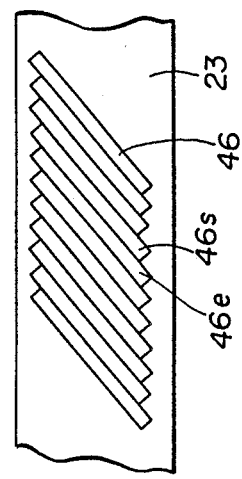
FIG. 6 shows a portion of a track pattern formed on the endless magnetic tape by use of the first embodiment.

As shown in FIG. 6, a start track 46s and an end track 46e of the tape 23 are in contiguous contact with each other. Hence, the recording and reproduction can be carried out continuously in an endless manner without a discontinuity between the start and end tracks 46s and 46e.

The tape transport speed $v_2$ of approximately 30 mm/sec employed in the present embodiment is considerably slow compared to the conventional tape transport speed $v_1$ described before. For this reason, the damage to the tape 23 caused by the tape transport is negligible and the tape 23 is not heated because of the slow tape transport speed used. The tape 23 can thus be transported stably for a long period of time thereby ensuring a high reliability of the endless video tape recorder.

According to the present embodiment, the tape is not twisted in the tape path on the entrance side of the guide drum along the tape transport direction and the tape path on the exit side of the guide drum along the tape transport direction because the guide drum is appropriately inclined to the horizontal plane. Therefore, the tape transport is stable at the peripheral surface of the guide drum, and satisfactory recording and reproducing characteristics can be obtained.

Figure 7:
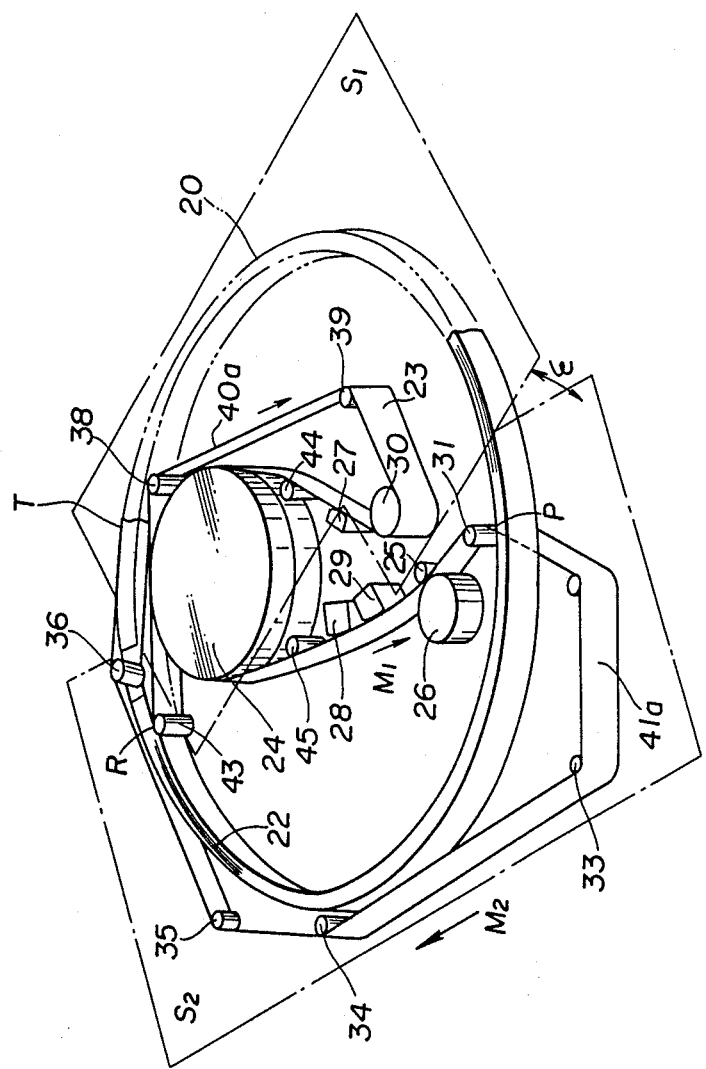
FIG. 7 is a perspective view showing a second embodiment of the guide structure for endless magnetic tape according to the present invention together with a part of the endless video tape reorder.
Figure 8:
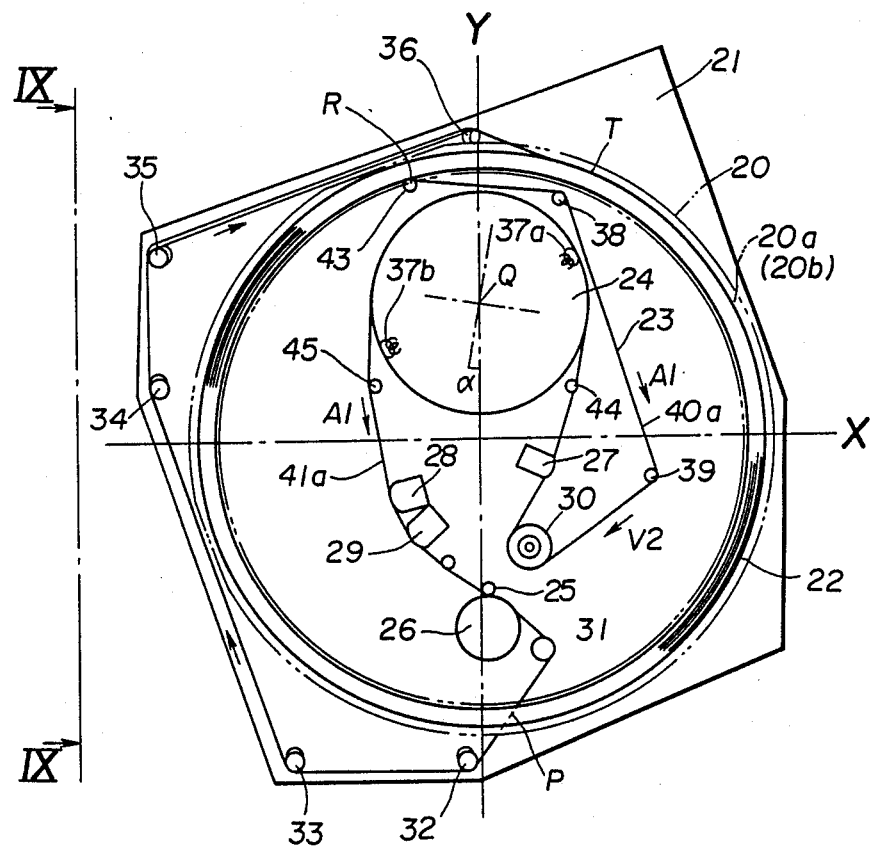
FIG. 8 is a plan view showing the guide structure shown in FIG. 7.
Figure 9:
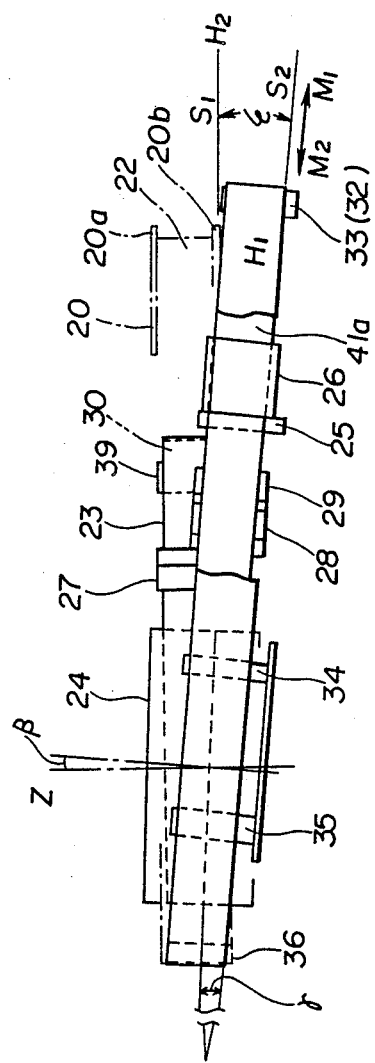
FIG. 9 is a side view showing the guide structure shown in FIG. 8 viewed from a direction IX.

FIG. 7 is a perspective view showing a second embodiment of the guide structure for endless magnetic tape according to the present invention. FIG. 8 is a plan view of the second embodiment, and FIG. 9 is a side view of the second embodiment viewed from a direction IX in FIG. 8. In FIGS. 7 through 9, those parts which are essentially the same as those corresponding parts in FIGS. 3 through 5 are designated by the same reference numerals, and a description thereof will be omitted.

In FIG. 9, $\alpha$ denotes a lead angle of the guide drum 24. The angle $\beta$ is substantially the same as the lead angle $\gamma$. In the present embodiment, tape guides 38 and 39 are provided on the entrance side of the guide drum 24.

During the recording and reproduction, the tape 23 is driven in the state pinched between the capstan 25 and he pinch roller 26 and is transported in a tape path described hereunder. The tape path is made up of tape path portions 40a and 41a. The entrance side tape path portion 40a begins from a position where the tape 23 is drawn out from an innermost turn of the tape roll 22 and ends at a position where the tape 23 reaches the guide drum 24. The exit side tape path portion 41a begins from a position where the tape 23 separates from the peripheral surface of the guide drum 24, passes a position under the stationary reel 20 and ends at a position where the tape 23 is returned to the outermost turn of the tape roll 22 after being transported on the outside of the stationary reel 20 for approximately one-half the circumference thereof. Hence, the tape path has an approximate delta-shape.

In the entrance side tape path portion 40a, the tape 23 is guided by the guide roller 43 from the position R and is drawn out to the inside of the stationary reel 20. The tape 23 is then guided by tape guide poles 38 and 39, wrapped partially around the impedance roller 30, makes sliding contact with the full width erase head 27 and reaches the peripheral surface of the guide drum 24.

The guide roller 43, the tape guide poles 38 and 39, the impedance roller 30, the full width erase head 27 and the pole 44 are all located on the horizontal plane $S_1$ and are provided perpendicularly to the horizontal plane $S_1$. Accordingly, in the tape path portion 40a, the tape 23 is drawn out of the tape roll 22 without being twisted and extend maintaining such a state that the surface of the tape 23 is perpendicular to the horizontal plane $S_1$.

The tape 23 is drawn out from the innermost turn of the tape roll 22 without being twisted and is transported parallel to the horizontal plane $S_1$ without being twisted. Thus, the tape 23 is transported in a state where the causes which disturb the tape transport are minimized. The provision of the impedance roller 30 even further stabilizes the tape transport. Because the tape transport in the tape path portion 40a is stable, the tape transport at the peripheral surface of the guide drum 24 is also stable. Therefore, the recording of the video signal can be carried out stably, and the video signal can be reproduced stably without a jitter.

The exit side tape path portion 41a is formed by the pole 45 and the guide poles 31 through 35 which are provided perpendicularly to a plane $S_2$. The plane $S_2$ is inclined by an angle $\epsilon$ in a predetermined direction with respect to the horizontal plane $S_1$, where $\epsilon$ is approximately two times the lead angle $\gamma$. The plane $S_2$ extends in the same direction as the tape 23 which finishes making contact with the peripheral surface of the guide drum 24 and extends in the direction of the lead.

The tape 23 which separates from the peripheral surface of the guide drum 24 is transported parallel to the plane $S_2$ in the state where the surface of the tape 23 is maintained perpendicular to the plane $S_2$. The tape 23 makes sliding contact with the audio head 28 and the control head 29 and is pinched between the capstan 25 and the pinch roller 26. Thereafter, the tape 23 is guided by the guide pole 31 and is guided obliquely downwardly as indicated by the arrow $M_1$. At the position P where the tape 23 passes under the stationary reel 20, the height $H_1$ of the top edge of the tape 23 is lower than the height $H_2$ of the bottom surface of the stationary reel 20, that is, the lower surface of the lower flange 20b.

The tape 23 which is transported by the capstan 25 and the pinch roller 26 is guided by the guide pole 31 and passes under the stationary reel 20 at the position P to the outside of the stationary reel 20 in the plan view. The tape 23 is successively guided by the guide poles 32, 33, 34 and 35 and is transported genrrally along the outside of the stationary reel 20 in the plan view while being guided obliuely upwardly as indicated by the arrow $M_2$ from the plane $S_2$. Thus, the height of the tape 23 gradually returns to the original height, that is, to the height of the stationary reel 20, and the tape 23 is directed to the position T which is approximately diametrical to the position P. The tape 23 is lastly guided by the guide pole 36 before being taken up on the outermost turn of the tape roll 22, and the guide pole 36 returns the height of the tape 23 to the original height which coincides with that of the stationary reel 20. The tape 23 is taken up o the outermost turn of the tape roll 22 at the position T.

Hence, the tape 23 is transported in the tape path portion 41a without being twisted. For this reason, the tape 23 is transported stably also in the tape path portion 41a.

The tape 23 has the shape of an endless loop. Hence, when the tape 23 is transported, the tape 23 is drawn out from the innermost turn of the tape roll 22 while the tape 23 is taken up on the outermost turn of the tape roll 22. In other words, the tape 23 is transported continuously in an endless manner while the tape roll 22 rotates clockwise independently of the stationary reel 20.

As shown in FIG. 6 described before, the start track 46s and the end track 46e of the tape 23 are in contiguous contact with each other. Hence, the tracks 46 are also formed continuously on the tape 23, and the recording and reproduction can be carried out continuously in an endless manner without a discontinuity between the start and end tracks 46s and 46e.

The tape transport speed $v_2$ of approximately 30 mm/sec employed in the present embodiment is considerably slow compared to the conventional tape transport speed $v_1$ described before. For this reason, the damage to the tape 23 caused by the tape transport is negligible and the tape 23 is not heated because of the slow tape transport speed used. The tape 23 can thus be transported stably for a long period of time thereby ensuring a high reliability of the endless video tape recorder.

According to the present embodiment, the tape is not twisted in the tape path on the entrance side of the guide drum along the tape transport direction and the tape path on the exit side of the guide drum along the tape transport direction because the guide drum is appropriately inclined to the horizontal plane. Therefore, the tape transport is stable and it is possible to suppress damage to the tape itself.

Figure 10:
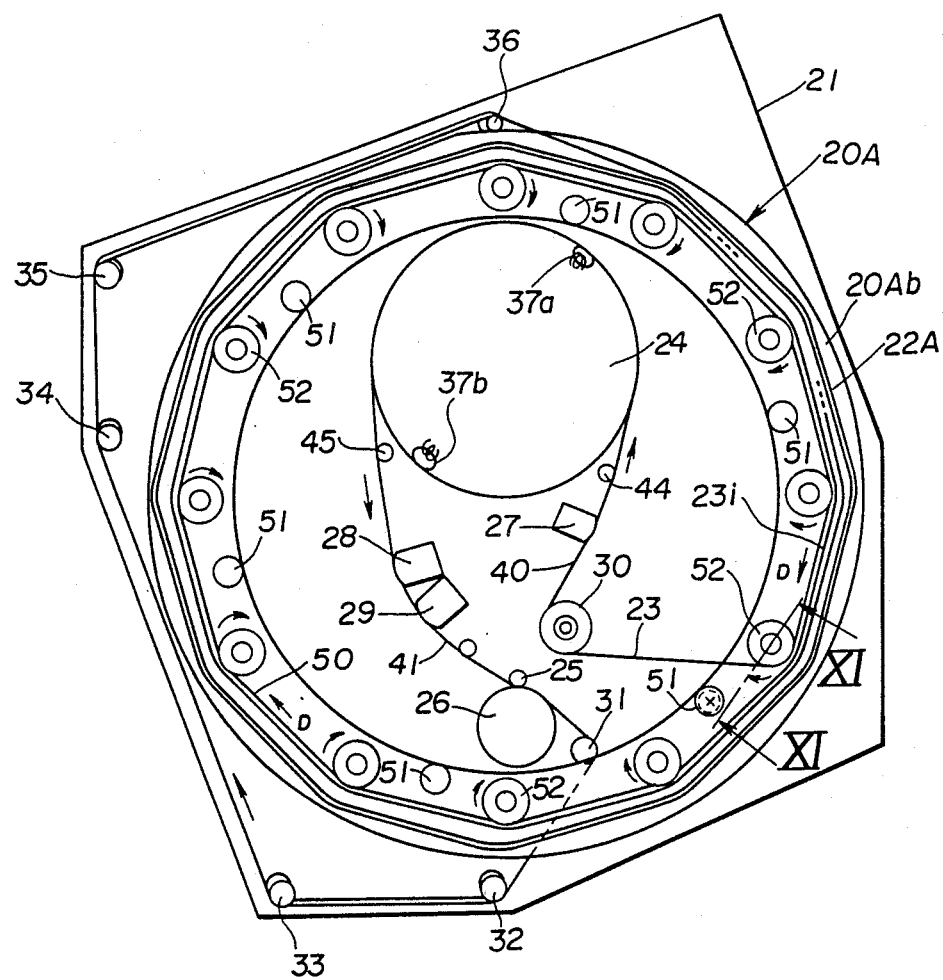
FIG. 10 is a plan view showing a third embodiment of the guide structure for endless magnetic tape according to the present invention together with a part of the endless video tape recorder.

FIG. 10 is a plan view showing a third embodiment of the guide structure for endless magnetic tape according to the present invention together with a part of the endless video tape recorder. FIG. 11 is a cross sectional view of the third embodiment along a line XI—XI in FIG. 10 showing the structure of a roller on an enlarged scale. In FIGS. 10 and 11, those parts which are essentially the same as those corresponding parts in FIGS. 3 through 5 are designated by the same reference numerals, and a description thereof will be omitted.

As shown in FIGS. 10 ad 11, a stationary reel 20A has an upper flange 20Aa, a lower flange 20Ab, a plurality of poles 51 and twelve rollers 52. FIG. 10 shows the guide structure with the upper flange 20Aa omitted. The poles 51 are arranged in the peripheral direction of the upper and lower flanges 20Aa and 20Ab, and the upper and lower flanges 20Aa and 20Ab are fixed on the upper and lower ends of the poles 51 by screws. The rollers 52 are arranged at equi-angular intervals along the inner peripheral direction of the lower flange 20Ab. A length l of the pole 51 is approximately the same as the width of the tape 23.

Each of the rollers 52 have a shaft 54 fixed on the lower flange 20Ab and bearings 55 and 56 which rotatably support the shaft 54 a shown in FIG. 11. The roller 52 additionally has a collar 57, a washer 58 and a spring 59.

A tape roll 22A is constituted by the tape 23 which is wound around the rollers 52. An innermost turn of the tape roll 22A has an approximate dodecagonal shape because twelve rollers 52 are provided in the present embodiment, and successive turns are wound on the innermost turn to make up the tape roll 22A.

When the tape 23 is transported and the tape 23 is drawn out from the innermost turn of the tape roll 22A, the tape roll 22A as a whole rotates clockwise. In addition, the tape roll 22A is restricted in the width direction thereof by the upper and lower flanges 20Aa and 20Ab.

An innermost turn 23i of the tape roll 22A rotates each of the rollers 52 clockwise as indicated by arrows in FIG.10, and the tape 23 is transported in a direction D without accompanying slippage between the tape 23 and the rollers 52. For this reason, the load acting on the innermost turn 23i is extremely small. In addition, even when the ambient temperature or the like changes and the overall length of the tape 23 changes thereby changing the pressing force with which the innermost turn 23i is wound around the rollers 52, the load acting on the innermost turn 23i and the tape transport remain virtually unchanged.

Accordingly, the tape transport is further stabilized by use of the stationary reel 20A, and the tape transport is maintained stable even when a large change occurs in the ambient temperature during the operation of the endless tape recorder. As a result, the recording and reproduction can constantly be carried out satisfactorily, and a reproduced picture including no jitter or skew is obtainable at the time of the reproduction.

FIG. 12 is a perspective view showing a fourth embodiment of the guide structure for endless magnetic tape according to the present invention. In FIG. 12, those parts which are essentially the same as those corresponding parts in FIGS. 3 through 5 are designated by the same reference numerals, and a description thereof will be omitted. In the present embodiment,, a first tape tension control part 70 is provided on the entrance side of the guide drum 24 along the tape transport direction, and a second tape tension control part 71 is provided on the exit side of the guide drum 24 along the tape transport direction.

The first tape tension control part 70 has a tension pole 73 which makes contact with the tape 23 on the entrance side of the guide drum 24, a tension detecting part 74 for detecting the tape tension responsive to a position of the tension pole 73, and a motor 75 for driving a driving pulley 30A at a rotational speed dependent on the tape tension detected by the tension detecting part 74. Hence, the tape tension at the entrance side of the guide drum 24 is controlled to a preset constant value by the first tape tension control part 70. In other words, the rotational speed of the driving pulley 30A is decreased when increasing the tape tension, and the rotational speed of the driving pulley 30A is increased when decreasing the tape tension.

On the other hand, the second tape tension control part 71 has an arm 78 rotatably supported on a pin 77, a balancing member 79 provided on one end of the arm 78, a pole 80 provided on the other end of the arm 78, a projecting part 81 formed at an intermediate portion of the arm 78, a coil spring 82 and a fixed pin 83. The coil spring 82 is provided between the projecting part 81 and the fixed pin 83. The tape 23 which passes by the guide pole 31 on the exit side of the guide drum 24 is wrapped partially around the pole 80, that is, intercepted by the pole 80 before reaching the guide pole 32. Accordingly, the tape tension at the exit side of the guide drum 24 is controlled to a preset constant value by the action of the coil spring 82 and the balancing member 79.

According to the present embodiment, the tap 23 is smoothly drawn out from the stationary reel 20 and the tape transport is stable because the tape tension is controlled constant at the entrance side of the guide drum 24 by the provision of the first tape tension control part 70. In addition, the contact pressure of the rotary magnetic heads with respect to the tape 23 can be controlled constant. As a result, it is possible to obtain satisfactory recording and reproducing characteristics. Moreover, the tape 23 is smoothly taken up on the stationary reel 20 and the tape transport is stable because the tape tension is controlled constant at the exit side of the guide drum 24 by the provision of the second tape tension control part 71. Hence, it is possible to obtain satisfactory recording and reproducing characteristics also from this point of view.

It is of course possible to provide only one of the first and second tape tension control parts 70 and 71. In addition, one or both of the first and second tape tension control parts 70 and 71 may be provided similarly in the second and third embodiments described before to obtain effects similar to those obtainable in the present embodiment, but illustration and description thereof will be omitted.

Figure 13A:
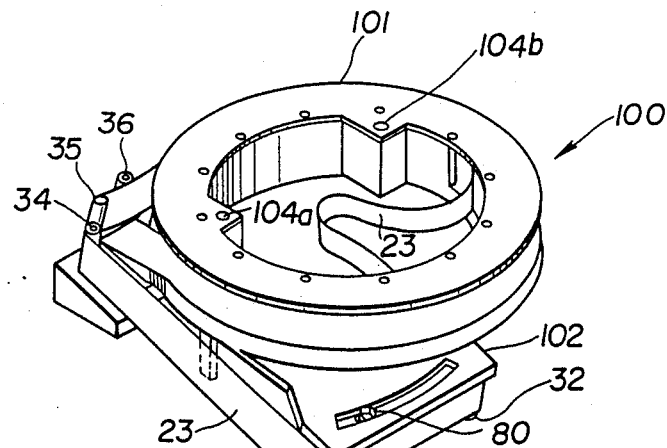
FIG. 13A is a perspective view showing a fifth embodiment of the guide structure for endless magnetic tape according to the present invention.
Figure 13B:
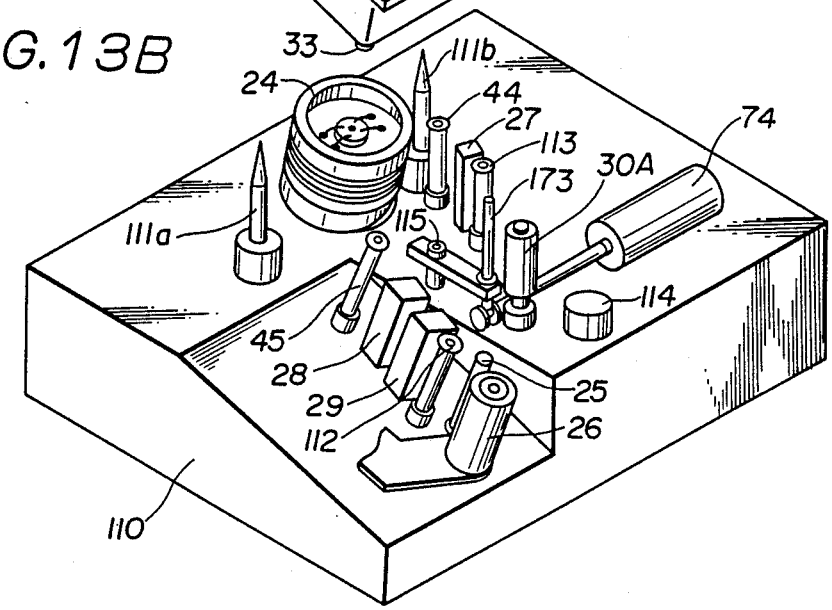
FIG. 13B is a perspective view showing an essential part of the endless video tape recorder to and from which the fifth embodiment of the guide structure is loaded and unloaded.

FIG. 13A is a perspective view showing a fifth embodiment of the guide structure for endless magnetic tape according to the present invention, and FIG. 13B is a perspective view showing an essential part of the endless video tape recorder to and from which the fifth embodiment is loaded and unloaded. In FIGS. 13A and 13B, those parts which are essentially the same as those corresponding parts in FIGS. 3 through 12 are designated by the same reference numerals, and a description thereof will be omitted. In the present embodiment, a part of the guide structure for the endless magnetic tape has the form of a tape cartridge so that the guide structure can be loaded to and unloaded from the endless video tape recorder with ease.

A tape cartridge 100 has a stationary reel 101 and a tape guide part 102. The stationary reel 20 of the first, second and fourth embodiments or the stationary reel 20A of the third embodiment may be used as the stationary reel 101. A pair of pin receiving holes 104a and 104b are provided in the flanges of the stationary reel 101. In the present embodiment, the second tap tension control part is provided in the tape cartridge 100 but it is not essential that the second tape tension control part is provided as described before.

On the other hand, the endless video tape recorder has a pair of guide pins 111a and 111b, poles 112 and 113, a rest 114, the guide drum 24 and the like provided on a chassis 110. In the present embodiment, the first tape tension control part is provided on the endless video tape recorder, but it is not essential that the first tape tension control part is provided as described before. In the present embodiment, the tension pole 73 is rotatable about a pin 115, and a displacement of the tension pole 73 is detected by the tension detecting part 74 constituted by a differential transformer transducer.

When loading the tape cartridge 100 to the endless video tape recorder, the gide pins 111a and 111b enter into the corresponding pin receiving holes 104a and 104b. Hence, the tape cartridge 100 is supported by the guide pins 111a and 111b and the rest 114 in a state where the tape cartridge 100 is positioned by the guide pins 111a and 111b. Although not shown in FIGS. 13A and 13B, it is desirable that the tape cartridge 100 loaded to the endless video tape recorder is temporarily secured on the endless video tape recorder by screws or the like until the tape cartridge 100 is changed. After the tape cartridge 100 is loaded to the endless video tape recorder, the tape 23 is manually set to the predetermined tape path which makes sliding contact with the guide drum 24 as described before in conjunction with the first through fourth embodiments. The tape cartridge 100 is unloaded from the endless video tape recorder in a reverse sequence as that at the time of the loading.

According to the present embodiment, the loading and unloading of the endless magnetic tape to and from the endless video tape recorder is facilitated because a part of the guide structure has the form of a tape cartridge. As a result, the application of the endless video tape recorder can be expanded.

Figure 14:
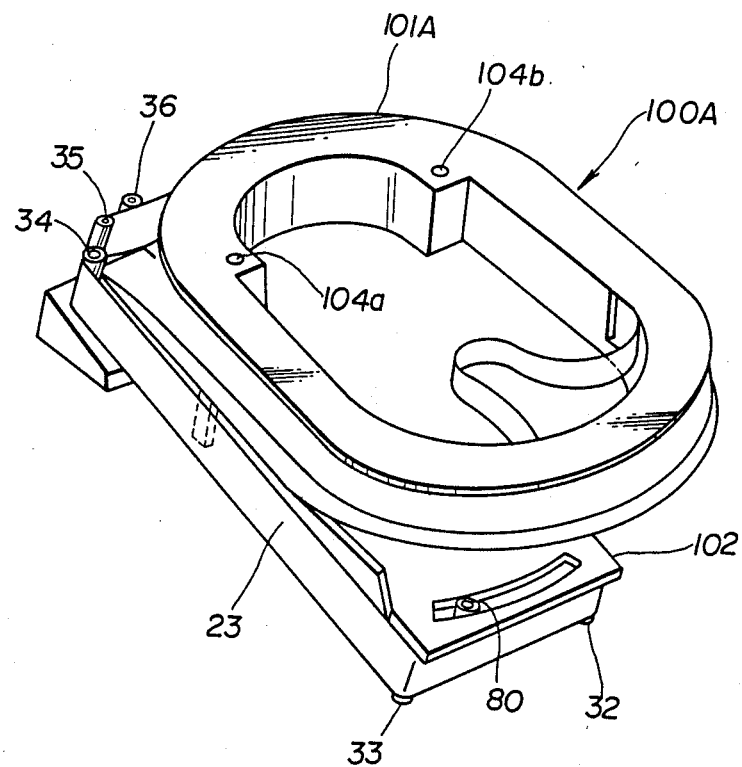
FIG. 14 is a perspective view showing a modification of the fifth embodiment.

FIG. 14 is a perspective view showing a modification of the fifth embodiment. In FIG. 14, those parts which are essentially the same as those corresponding parts in FIG. 13A are designated by the same reference numerals, and a description thereof will be omitted. In the present modification, a tape cartridge 100A has a stationary reel 101A having a generally oval ring shape. The effects obtainable by the present modification are the same as those obtainable in the fifth embodiment. The stationary reel 101A may be shaped appropriately to suit the construction of the endless video tape recorder.

The stationary reel having the generally oval ring shape as in the case of the present modification may also be used in the first through fourth embodiment described before.

In addition, when providing a plurality of rollers in the stationary reel as in the case of the third embodiment, the rollers need not necessarily be arranged at equi-angular intervals.

Further, the present invention is not limited to these embodiments, but various variations and modifications may be made without departing from the scope of the present invention.

What is claimed is:

1. A guide structure for guiding an endless magnetic tape having a form of an endless loop in a predetermined tape path within an endless video tape recorder, said endless video tape recorder having a rotary guide drum provided with rotary magnetic heads for recording and/or reproducing an information signal on and/or from the magnetic tape which is wrapped around an outer peripheral surface of the guide drum for a predetermined angular range, said guide structure comprising:

a stationary reel having an upper flange and a lower flange and provide on a first plane, said stationary reel having a ring shape and being wound with the magnetic tape which constitutes a tape roll having an innermost turn and an outermost turn, said upper and lower flanges restricting a movement of the magnetic tape in a direction along a width of the magnetic tape;

first guide means located on an inside of said stationary reel for guiding the magnetic tape which is drawn out from the innermost turn of the tape roll in a first tape path portion to a position where the magnetic tape makes sliding contact with the outer peripheral surface of the guide drum, said first tape path portion being parallel to said first plane;

second guide means located on the inside of said stationary reel for guiding the magnetic tape which finishes making sliding contact with the outer peripheral surface of the guide drum in a second tape path portion to a position under said stationary reel, said second tape path portion being parallel to a second plane which is inclined by predetermined angle to said first plane; and third guide means for guiding the magnetic tape from said second tape path portion in a third tape path portion on an outside of said stationary reel, the magnetic tape in said third tape path portion being guided to a height position of said stationary reel to be taken up on the outermost turn of the tape roll.

2. A guide structure as claimed in claim 1 in which said guide drum is located on a plane which is inclined by a certain angle to said first plane in a predetermined direction.

3. A guide structure as claimed in claim 1 in which said predetermined angle is approximately two times a lead angle of said guide drum.

4. A guide structure as claimed in claim 1 in which said rotary magnetic heads carry out the recording and/or reproduction of the information signal in conformance with a helical scan system.

5. A guide structure as claimed in claim 1 in which said first guide means includes an impedance roller for stabilizing tape transport.

6. A guide structure as claimed in claim 1 in which the magnetic tape in said second tape path portion is driven by a capstan and a pinch roller of the endless video tape recorded.

7. A guide structure as claimed in claim 1 in which said stationary reel further has a plurality of rollers arranged along a peripheral direction thereof between the upper and lower flanges, the magnetic tape being wound around the rollers thereby said innermost turn of the tape roll being in direct contact with the rollers.

8. A guide structure as claimed in claim 1 which further comprises tape tension control means for controlling a tape tension in said first tape path portion approximately constant.

9. A guide structure as claimed in claim 8 in which said tape tension control means includes detecting means for detecting the tape tension in said first tape path portion, a driving pulley partially wrapped with the magnetic tape in said first tape path portion, and means for rotating said driving pulley at a rotational speed dependent on the tape tension detected by said detecting means.

10. A guide structure as claimed in claim 1 which further comprises tape tension control means for controlling a tape tension in said second tape path portion approximately constant.

11. A guide structure as claimed in claim 10 in which said tape tension control means includes an arm rotatable about a base end thereof, a pole located on a free end thereof and spring means for urging the arm to rotate in a certain direction with a predetermined force, said pole intercepting the magnetic tape in said second tape path portion.

12. A guide structure as claimed in claim 1 which further comprises first tape tension control means for controlling a tape tension in said first tape path portion approximately constant and second tape tension control means for controlling a tape tension in said second tape path portion approximately constant.

13. A guide structure as claimed in claim 1 which further comprises tape tension control means for controlling a tape tension in said first tape path portion approximately constant, said stationary reel further having a plurality of rollers arranged along a peripheral direction thereof between the upper and lower flanges, the magnetic tape being wound around the rollers thereby said innermost turn of the tape roll being in direct contact with the rollers.

14. A guide structure as claimed in claim 1 which further comprises tape tension control means for controlling a tape tension in said second tape path portion approximately constant, said stationary reel further having a plurality of roller arranged along a peripheral direction thereof between the upper and lower flanges, the magnetic tape being wound around the rollers thereby said innermost turn of the tape roll being in direct contact with the rollers.

15. A guide structure as claimed in claim 1 which further comprises first tape tension control means for controlling a tape tension in said first tape path portion approximately constant and second tape tension control means for controlling a tape tension in said second tape path portion approximately constant, said stationary reel further having a plurality of rollers arranged along a peripheral direction thereof between the upper and lower flanges, the magnetic tape being wound around the rollers thereby said innermost turn of the tape roll being in direct contact with the rollers.

16. A guide structure as claimed in claim 1 in which the magnetic tape is driven in a tape transport direction by a capstan and a pinch roller of the endless video tape recorder, said first tape path portion being located on an entrance side of the guide drum along the tape transport direction, said second tape path portion being located on an exit side of the guide drum along the tape transport direction.

17. A guide structure as claimed in claim 1 in which at least said stationary reel has a form of a tape cartridge which is easily detachable with respect to the endless video tape recorder.

18. A guide structure as claimed in claim 17 in which said tape cartridge includes tape tension control means for controlling a tape tension in said second tape path portion.

19. A guide structure as claimed in claim 1 in which said stationary reel has a generally oval ring shape.

20. A guide structure as claimed in claim 1 in which said stationary reel has a generally circular ring shape.

* * * * *